(12) United States Patent
Huber et al.

(10) Patent No.: US 11,396,893 B2
(45) Date of Patent: Jul. 26, 2022

(54) TANK FOR A HYDRAULIC UNIT

(71) Applicant: Robert Bosch GmbH, Stuttgart (DE)

(72) Inventors: Alexander Huber, Lohr (DE); Andreas Guender, Ramsthal (DE); Jan Lukas Bierod, Bad Camberg (DE); Marco Scholz, Burgsinn (DE); Mark-Patrick Muehlhausen, Aschaffenburg (DE); Matthias Steiner, Hartenstein (DE); Ralf Maier, Neuendorf (DE); Rene Huettl, Chemnitz (DE)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 16/653,320

(22) Filed: Oct. 15, 2019

(65) Prior Publication Data
US 2020/0124059 A1    Apr. 23, 2020

(30) Foreign Application Priority Data
Oct. 19, 2018    (DE) ............... 10 2018 217 930.1

(51) Int. Cl.
| F15B 1/00 | (2006.01) |
| F15B 1/26 | (2006.01) |
| F15B 21/047 | (2019.01) |
| F15B 21/0423 | (2019.01) |
| B60K 15/077 | (2006.01) |
| B01D 19/00 | (2006.01) |

(52) U.S. Cl.
CPC ............. *F15B 1/26* (2013.01); *F15B 21/047* (2013.01); *F15B 21/0423* (2019.01); *B01D 19/0042* (2013.01); *B60K 2015/0777* (2013.01); *Y10T 137/86187* (2015.04); *Y10T 137/86204* (2015.04); *Y10T 137/86212* (2015.04)

(58) Field of Classification Search
CPC ............ B01D 19/0042; B01D 17/0211; B01D 29/21; B01D 2201/295; B01D 2201/0415; B01D 17/047; B60K 2015/0777; B62D 5/062; F15B 1/26; F15B 21/0423; F15B 21/047; F15B 21/04; F15B 21/0427; F15B 21/044; F15B 21/042; Y10T 137/86204; Y10T 137/86324; Y10T 137/86212; Y10T 137/86187; Y10T 137/86228; E02F 9/226; E02F 9/0883; Y10S 165/916
USPC .... 137/574, 576, 587, 549, 171, 899.4, 550, 137/571; 60/453, 454; 95/262, 267, 272, 95/263; 220/563, 564, 562; 96/193, 350
See application file for complete search history.

(56) References Cited

U.S. PATENT DOCUMENTS

| 1,095,478 A | * | 5/1914 | Strohbach | .......... B01D 19/0031 96/206 |
| 1,432,351 A | * | 10/1922 | Walker | ............... B01D 17/0202 210/284 |
| 2,669,254 A | * | 2/1954 | Mork | ..................... F15B 21/047 210/172.2 |

(Continued)

*Primary Examiner* — Gideon R Weinerth
(74) *Attorney, Agent, or Firm* — Maginot, Moore & Beck LLP

(57) ABSTRACT

A hydraulic unit includes a tank configured to be filled with a hydraulic fluid. The tank has at least one inflow connection and at least one outflow connection. A flow guide for the hydraulic fluid is formed between the inflow connection and the outflow connection. The flow guide is configured to have at least two 180° flow arcs configured to cool and calm the hydraulic fluid and to avoid dead zones.

15 Claims, 2 Drawing Sheets

(56) References Cited

U.S. PATENT DOCUMENTS

| | | | | |
|---|---|---|---|---|
| 2,799,645 | A * | 7/1957 | Musgrove | C10G 33/06 210/801 |
| 3,214,023 | A * | 10/1965 | Donner | B01D 29/15 210/172.2 |
| 4,061,031 | A * | 12/1977 | Grimsrud | A61B 5/026 73/200 |
| 4,210,176 | A * | 7/1980 | Emming | F15B 1/26 137/573 |
| 4,424,829 | A * | 1/1984 | Millington | B62D 5/062 137/574 |
| 4,431,027 | A * | 2/1984 | Sabina, Jr. | B62D 5/062 137/574 |
| 5,906,221 | A * | 5/1999 | Mancell | B62D 5/062 137/549 |
| 5,937,671 | A * | 8/1999 | Inoue | F25B 43/003 62/509 |
| 6,116,454 | A | 9/2000 | Henderson et al. | |
| 6,176,903 | B1 * | 1/2001 | Wamsiedler | A61M 1/1658 210/436 |
| 6,502,630 | B1 * | 1/2003 | MacFarlane | F16N 39/002 123/196 AB |
| 6,913,040 | B2 * | 7/2005 | Crossman | B01D 29/117 137/587 |
| 7,886,768 | B2 * | 2/2011 | Kobayashi | F15B 1/26 137/576 |
| 7,892,331 | B2 * | 2/2011 | Childers | A61M 1/3627 96/189 |
| 8,101,089 | B2 * | 1/2012 | Drewelow | B01F 3/04113 210/767 |
| 8,579,143 | B2 * | 11/2013 | Koshino | F01P 11/029 220/509 |
| 9,109,612 | B2 * | 8/2015 | Gilmore | E02F 9/0883 |
| 2005/0092375 | A1 * | 5/2005 | Kim | B60T 17/06 137/574 |
| 2006/0137663 | A1 * | 6/2006 | Vaught | B01D 19/0042 123/516 |
| 2008/0289917 | A1 * | 11/2008 | L'Aot | B60T 17/06 188/152 |
| 2009/0184036 | A1 * | 7/2009 | Martin | B01D 29/902 210/131 |
| 2010/0006577 | A1 * | 1/2010 | Koshino | F01P 11/029 220/501 |
| 2010/0045017 | A1 * | 2/2010 | Rea | B21D 51/18 220/4.12 |
| 2010/0139491 | A1 * | 6/2010 | Ingvast | B01D 19/0036 96/188 |
| 2011/0284089 | A1 * | 11/2011 | Knuth | F15B 1/26 137/1 |
| 2012/0145267 | A1 * | 6/2012 | Haslberger | B66F 9/07518 220/601 |
| 2013/0081708 | A1 * | 4/2013 | Wirth | F15B 21/044 137/255 |
| 2015/0224423 | A1 * | 8/2015 | Simcina | B01D 19/0057 95/260 |
| 2015/0226241 | A1 * | 8/2015 | Tanaka | F15B 21/044 96/215 |
| 2015/0247511 | A1 * | 9/2015 | Barr | B60T 17/06 60/327 |
| 2016/0206975 | A1 * | 7/2016 | Carl | B01D 19/0042 |
| 2016/0256797 | A1 * | 9/2016 | Yu | B01D 19/0042 |
| 2016/0279537 | A1 * | 9/2016 | Poon | B01D 19/0042 |
| 2017/0276154 | A1 * | 9/2017 | Stallmann | B04C 5/13 |
| 2017/0298965 | A1 * | 10/2017 | Vigholm | B01D 35/005 |
| 2020/0155970 | A1 * | 5/2020 | Gaikwad | B01D 19/0042 |
| 2021/0039019 | A1 * | 2/2021 | Bergstedt | B01D 19/0042 |
| 2021/0131062 | A1 * | 5/2021 | Louis | F15B 21/044 |

* cited by examiner

TANK FOR A HYDRAULIC UNIT

This application claims priority under 35 U.S.C. § 119 to patent application no. DE 10 2018 217 930.1, filed on Oct. 19, 2018 in Germany, the disclosure of which is incorporated herein by reference in its entirety.

BACKGROUND

The disclosure relates to a tank for a hydraulic unit.

Hydraulic systems are used for example to transmit force and/or energy using fluids, such as hydraulic oil, for example. In the case of working hydraulics, for example, mechanical power of a driving machine, for example of an electric motor, can be converted by a pump into hydraulic power which can then be used by consumers, such as hydraulic cylinders, for example. The energy and/or power is transmitted by a pressure and/or a delivery flow which is generated by the pump. Here, the hydraulic fluid and/or the hydraulic oil remain/remains in a circuit, that is to say that a pump can for example deliver the hydraulic fluid to a consumer and the hydraulic fluid can be delivered back from there into a fluid container, for example. In other words, a hydraulic system requires a fluid accumulator or a tank in which the hydraulic fluid is stored, with the tank allowing the hydraulic system to react in a flexible manner. Specifically, there are states in which more hydraulic fluid is required for the system and other states in which less hydraulic fluid is required. Such a tank is known from U.S. Pat. No. 6,116,454 A, for example.

Against this background, the object on which the disclosure is based is to provide a cost-effective tank for a hydraulic unit, said tank being simple in terms of device design and being improved.

SUMMARY

The object is achieved according to the features of the disclosure. Further developments of the disclosure form the subject matter of the dependent claims.

According to the disclosure, a tank for a hydraulic unit, for example for working hydraulics, is provided. The tank can be able to be filled with a hydraulic fluid, for example with hydraulic oil. In order that the hydraulic fluid can flow in and out, two connections, an inflow connection and an outflow connection, are provided on the tank. Hydraulic fluid can flow for example into a tank via the inflow connection, said fluid being transferred for example from a consumer, for example a hydraulic cylinder and/or a hydraulic motor. For example, a hydraulic machine, for example in the form of a hydraulic pump, can suck hydraulic fluid from the tank through the outflow connection and deliver it to consumers. Between the inflow connection and the outflow connection there is formed a flow guide for the hydraulic fluid, that is to say a path on which the hydraulic fluid moves from the inflow connection to the outflow connection. Here, the flow guide is formed in such a way that it has at least two flow arcs which each have an angle of 180° or approximately 180°. That is to say that there occurs a main direction flow change through at least twice 180°.

The advantage with the comparatively large flow arcs is that, for example, a tank volume is well utilized and the tank can thus be realized with a compact design. In other words, the hydraulic fluid preferably flows through the entire or substantially the entire volume of the tank. By virtue of the fact that the flow guide flows through the entire tank, dead volumes are additionally reduced, that is to say regions in which the hydraulic fluid is not in movement are reduced or avoided. A further advantage of the disclosure is that the hydraulic fluid can be calmed by the flow guide which has at least two main direction flow changes of 180°. Any turbulent inflow of the hydraulic fluid through the inflow connection which leads to swirling of the hydraulic fluid can be effectively calmed by the length of the flow guide as far as the outflow connection. Furthermore, a reduction in a temperature-induced hydraulic fluid aging can be achieved. In other words, the main flow direction change in the tank makes it possible to achieve a situation in which, by virtue of the flow guide which has at least two main flow direction changes, the hydraulic fluid, which flows into the tank through the inflow connection particularly at an elevated temperature, cools comparatively quickly to the temperature level of the tank until the hydraulic fluid reaches the outflow connection. In addition, the required tank volume can be reduced by means of the disclosure. Without the main flow direction changes, a large hydraulic fluid volume must be present in the tank in order that the temperature in the hydraulic fluid does not rise excessively, since constant mixing of the hydraulic fluid is not ensured. This can also be resolved by the main flow direction change. If the hydraulic fluid is more viscous at a low temperature than at a higher temperature, it is thus particularly advantageous since mixing of the hydraulic fluid thus takes place by virtue of the flow guide which has at least two 180° flow arcs, and no hydraulic fluid flows from the inflow connection to the outflow connection without being mixed with cool oil. In other words, a short-circuit hydraulic fluid guide from the inflow connection to the outflow connection is prevented. In this way, the entire hydraulic fluid is circulated and there occurs uniform use of the fluid. This also reduces the hydraulic fluid ageing and it is thus possible for example for change intervals of the hydraulic fluid to be longer. The extended maintenance and change intervals make it possible for time and costs to be reduced and additionally for resources to be saved. Other components of the hydraulic unit, such as, for example, seals and/or hoses, can also be adversely affected by too high a temperature of the hydraulic fluid, and this can also be prevented by means of the disclosure since the hydraulic fluid flowing through the outflow connection into the hydraulics has a low temperature.

The flow is advantageously guided by at least one guiding wall. In other words, the flow of the hydraulic fluid is influenced by at least one guiding wall in such a way that the main flow direction changes and the flow guide has at least two 180° flow arcs. The guiding wall is preferably designed and arranged in such a way that the entire hydraulic fluid must follow the flow guide and no short-circuit flow occurs between the inflow connection and the outflow connection. The tank can be produced cost-effectively and be constructed in a simple manner by virtue of the guiding walls.

It is particularly advantageous if there are at least two portions in the flow guide in which the flow guide follows the gravitational force. This is particularly advantageous since air or else air bubbles can thus be separated from the hydraulic fluid. During a flow of hydraulic fluid in the downward direction, that is to say during flow guidance with the gravitational force, the separation of the air from the hydraulic fluid is improved, that is to say air bubbles are formed for example. During a flow in the upward direction, that is to say during flow guidance counter to the gravitational force, the separated air can be transported to the surface and the hydraulic fluid thus has a lesser tendency to foam. The separation of the air from the hydraulic fluid makes it possible, for example, for the cooling power of the hydraulic fluid to be improved, for the compressibility of the hydraulic fluid to be reduced and for the delivery power of the pump, which can, for example, pump the hydraulic fluid from the outflow connection, to be increased.

In order to optimize the separation of air from the hydraulic fluid, it is particularly advantageous if the flow guide extends upwardly and downwardly in alternation between the inflow connection and the outflow connection. For example, it can first extend upwardly, then downwardly, then upwardly again and subsequently downwardly again. It is also conceivable that the flow guide first extends downwardly. If the flow guide extends downwardly, the air can then be separated from the hydraulic fluid. With an upward extent of the flow guide, the flow can bring the air toward the surface. The separation of the air makes it possible to prevent damage to consumers of the hydraulic unit and of the downstream hydraulic system.

The main flow direction preferably changes at least partially or substantially in a plane. In other words, it is advantageous if the flow arcs lie on the plane. The guiding wall/guiding walls is/are thus formed for example approximately perpendicular to the plane. Consequently, a simple and cost-effective construction and production of the tank is possible.

Furthermore, it is advantageous if the plane in which the main flow direction changes is parallel to the gravitational force. The flow can thus change upwardly and downwardly. This is, as described above, advantageous for the air separation of the hydraulic fluid.

Furthermore, it is advantageous if the inflow connection and the outflow connection are arranged below the minimum hydraulic fluid filling level. The minimum hydraulic fluid filling level is not fallen below during an operation of the hydraulic unit. In other words, the connections are situated at all times below the fluid surface. This is advantageous since by for example a foaming at the inflow connection that arises by a striking of hydraulic fluid on hydraulic fluid can thus be prevented. Furthermore, it is possible to avoid air being sucked in via the outflow connection.

In a further exemplary embodiment, the inflow connection is preferably arranged higher than the outflow connection. This is advantageous since no power and/or energy thus has to be provided in order to ensure that the hydraulic fluid flows from the inflow connection to the outflow connection. Furthermore, the flow guide can be lengthened such that the inflow and outflow are situated as far apart as possible in terms of the oil flow.

The tank is preferably designed in such a way that it has at least four lateral tank walls and has, for example, an upper and a lower tank wall. The four lateral tank walls preferably extend from the bottom upwardly and two of the four tank walls can preferably be larger tank walls. In other words, the tank, if it is viewed for example from the top and/or from the bottom in the direction of the gravitational force, has a rectangular basic shape, with two sides being designed to be wider. The large tank walls can preferably be arranged approximately at a parallel spacing from one another. Furthermore, they can have an identical shape. The small tank walls can then extend between the large tank walls approximately at a parallel spacing from one another. Furthermore, a tank bottom and a tank cover are preferably provided. The tank can alternatively also be designed in such a way that all the tank walls are of identical size. In this case, the first and second tank wall can also be arranged approximately at a parallel spacing from one another, and the third and fourth tank wall likewise extend approximately at a parallel spacing between the first and second tank wall.

The tank preferably has at least two guiding walls. The flow guide according to the disclosure with at least two 180° flow arcs can thus be constructed and implemented in a simple manner.

The guiding walls preferably extend from a large tank wall to a second large tank wall or, if the tank walls are of equal size, the guiding walls extend from a first tank wall to a further second tank wall. Furthermore, the guiding walls extend from one tank wall to a further tank wall in such a way that a symmetrical design of the tank is thus preferably produced. Here, the axis of symmetry preferably lies on a plane which is situated centrally between the first tank wall and the second tank wall. Construction is thus easy to carry out. Furthermore, easy production of the tank can thus also occur, for example by means of welding in the case of a metal tank.

In addition, the guiding walls are preferably of double-walled design. In other words, a guiding wall fills a volume in the tank. Here, the double walls do not always have to have the same spacing from one another. That is to say that the walls of the guiding wall can be further away from one another in one region than in other regions.

The interior of the respective double-walled guiding wall can additionally be open to one or both large tank walls. In other words, if the tank is viewed from outside, the tank has a clearance between the walls of the respective double-walled guiding wall. It is possible for example for a hydraulic fluid circulating motor to be integrated into this clearance. There is thus no need for more installation space, for example in a working machine, to be created for said motor. Furthermore, a hydraulic machine and/or a hydraulic pump can additionally be arranged in one of the clearances of the guiding walls, that is to say be integrated or else be partially integrated within this clearance. This, too, can save installation space. The double-walled guiding walls can be obtained in a particularly simple manner with a plastic, preferably by rotational molding. In other words, the double-walled guiding walls are designed as continuous clearances. The double-walled guiding walls preferably further lead to stiffening of the tank.

One of the guiding walls preferably extends downwardly starting from above a maximum hydraulic fluid filling level. Furthermore, this guiding wall can be formed in such a way that its lower end is arranged below the inflow connection.

This first guiding wall, which extends downwardly starting from above a maximum hydraulic fluid filling level, that is to say projects beyond the hydraulic fluid surface, additionally divides the hydraulic fluid surface into two portions. In one portion, hydraulic fluid flows through the inflow connection into the tank, that is to say the surface of the hydraulic fluid can be uncalm in this portion, that is to say wave formation can be present. In other words, a turbulent inflow region can be formed. By contrast, the surface of the hydraulic fluid which is separated therefrom is calm, that is to say formed with a calm zone at the surface, and thus the probability is less that air is mixed with the hydraulic fluid in this region. Since the calm zone is arranged in the flow guide from the inflow connection to the outflow connection downstream of the turbulent inflow region, the properties of the hydraulic fluid are thus improved and a secure operation of the hydraulic unit is ensured.

With preference, the above-described guiding wall can additionally furthermore encompass the inflow connection. In other words, the guiding wall can encompass the inflow connection in a U shape, with an opening of the U-shaped guiding wall being directed upwardly. A leg of the U-shaped guiding wall can be arranged below the minimum hydraulic fluid filling level, and the second end or the second leg can furthermore project beyond the maximum hydraulic fluid filling level. Furthermore, it is to be preferred if the first leg, which is arranged below the minimum hydraulic fluid filling level of the hydraulic fluid, is arranged above the inflow connection. The inflow connection is thus enclosed on three sides, with the result that it is always arranged below the surface of the hydraulic fluid. The back-flowing hydraulic fluid can thus be directly calmed, that is to say that foaming of the hydraulic fluid is avoided. Furthermore, the flow guide can be lengthened by widening the guiding wall and thus the cooling and the calming of the hydraulic fluid can be optimized. In addition, the air separation of the hydraulic fluid can be improved by a further deflection of the hydraulic fluid.

It is also conceivable that the first guiding wall is L-shaped, with the lower leg then being able to lie below the inflow connection.

Furthermore, a further guiding wall can extend starting from a small lateral tank wall or, if all the tank walls are the same size, extend starting from a third or fourth tank wall. Here, an end or a leg of the guiding wall can project upwardly. In other words, the guiding wall describes a direction of change from one leg to another leg of approximately 90° or the guiding wall is approximately L-shaped. The end which extends starting from the small or third or fourth tank wall can be formed in one piece with the tank wall or the guiding wall can contact the tank wall at this point (kiss-off connection). It is particularly advantageous if this second guiding wall is arranged below the first guiding wall. This means in other words that the second guiding wall is arranged below the first guiding wall and the inflow connection and above the outflow connection.

A flow duct is preferably formed between the second and the first guiding wall.

In summary, it is to be preferred if the guiding wall and/or the guiding walls is/are arranged in such a way that the flow guide is thus formed as follows. The flow guide begins at the inflow connection and the hydraulic fluid flows from the inflow connection to the outflow connection. Beginning from the inflow connection, the hydraulic fluid flows along the flow guide upwardly between the U-shaped legs of the first guiding wall, in particular if the latter is U-shaped. If the guiding wall is L-shaped, the hydraulic fluid flows laterally or obliquely downwardly from the inflow connection. The hydraulic fluid then flows downwardly, that is to say there occurs a main flow direction change through 180°, along the first leg of the first U-shaped guiding wall, said leg ending below the minimum hydraulic fluid filling level. From there, the flow guide extends along around the U-shaped guiding wall, that is to say the flow guide has a further 180° flow arc. In the case of the L-shaped guiding wall, there is first provided a 180° flow arc which is adjoined by a 90° flow arc. The hydraulic fluid now flows along between the first guiding wall, more precisely the leg which ends above the maximum hydraulic fluid filling level, and between the second guiding wall, more precisely between the leg of the second guiding wall that extends upwardly. The flow guide then extends around the second guiding wall, that is to say the hydraulic fluid flows around the leg of the second guiding wall, with the result that the hydraulic fluid now flows downwardly, that is to say the flow guide follows a 180° flow arc. The flow guide now extends along the second guiding wall, that is to say the main flow direction is changed by approximately 90°. The hydraulic fluid can then flow into the outflow connection. In other words, the flow guide, in particular in the case of a U-shaped guiding wall, first extends upwardly, the flow guide is then changed by 180° and the flow flows downwardly, a further main flow direction change then occurs through 180°, with the result that the flow again flows upwardly, a main flow direction change then occurs through 180°, the flow now flows downwardly and then there occurs a final main flow direction change through 90° until the flow flows to the outflow connection. This flow guide is particularly advantageous since the volume of the tank can thus be very well utilized, with the result that optimum degassing, optimum cooling and optimum calming of the hydraulic fluid can take place.

It can be advantageous if at least one temperature sensor is arranged in the tank. This can, for example, measure the temperature of the hydraulic fluid at the outflow connection and thus determine whether the cooling is sufficient and/or whether for example something in the hydraulic unit is defective and a temperature increase therefore occurs. This serves for component protection and can reveal a defect of a consumer, for example. It is additionally possible for further sensors to be arranged in the tank. For example, a pressure sensor and/or a sensor which can determine the hydraulic fluid ageing can be integrated. Since the temperature is distributed comparatively uniformly in the tank by virtue of the optimum mixing of the hydraulic fluid, a flexible arrangement of the temperature sensor is made possible.

It is additionally to be preferred that at least one functional element is integrated into the tank. In other words, the tank can be constructed and manufactured with the functional element, and thus they do not have to be incorporated into the tank additionally and/or after manufacturing. If the tank is rotationally molded for example, these functional elements can already be created during the rotational molding. The functional elements include for example the inflow connection and/or the outflow connection and/or fastening possibilities, such as, for example, inserted nuts, and/or for example connections for a hydraulic fluid cooling circuit. The inserted nuts allow the tank to be easily fastened for example to the underlying surface and/or to additional components.

It can additionally be advantageous to connect a hydraulic fluid cooling circuit to the tank. This can additionally circulate the hydraulic fluid and/or cool it in an additional circuit in order to keep the hydraulic fluid temperature low. The hydraulic fluid cooling circuit can be used for example in conjunction with the temperature sensor. If the temperature sensor for example signals an excessive temperature, the hydraulic fluid cooling circuit can for example begin to additionally cool the hydraulic fluid. Consequently, hydraulic fluid ageing can be avoided and/or reduced.

It is particularly advantageous if the tank additionally has an upper tank wall which is formed at least partially or substantially completely perpendicularly to the direction of gravitational force. In other words, the tank has a tank cover. The tank cover can preferably have a three-sided border to collect hydraulic fluid which drops for example from components which are arranged above the tank. The three-sided border allows the hydraulic fluid to be channeled away in one direction in a targeted manner. A four-sided border having at least one outflow in one of the four borders would also be possible. It is thus possible to avoid pollution to the surroundings in which for example the hydraulic unit is used. This can counteract environmental pollution. The tank cover can for example additionally perform further functions, such as, for example, a ventilation and/or a degassing function. Furthermore, it is possible for example for a float switch and/or further valves to be integrated in the tank cover.

Furthermore, a drainage device and/or a filling device can be provided in the tank. It is thus possible for example for old hydraulic fluid to be easily exchanged. The filling device also allows hydraulic fluid to be regularly replenished, for example if consumers have a leakage and thus hydraulic fluid flows out of the system of the hydraulic unit. The filling and drainage of the hydraulic fluid can thus be configured in a cost-effective and simple manner.

In one exemplary embodiment, the tank can additionally have crossmembers and/or indentations which project inwardly from outside. They can ensure additional stability, for example if the tank is produced from plastic. Furthermore, the mechanical stability can be increased.

It is particularly advantageous if the tank is rotationally molded. For this purpose, use is made of a hollow body mold which is filled for example with a plastic and/or thermoplastic melt and, by means of rotation, the plastic is pressed against the inner walls of the hollow body mold and the tank can thus be molded. This is a simple and cost-effective method for producing a tank, and complicated shaping of the tank is additionally possible. The manufacture of the tank by rotational molding means that further functional elements and/or connections and/or inserts, such as, for example, nuts, can be integrated already during the manufacturing. Furthermore, uniform wall thicknesses and thus precise manufacturing can be achieved.

In another exemplary embodiment, the tank can be produced from metal and/or sheet metal, with the guiding walls being connected to the tank walls for example in a form-fitting and/or integrally bonded and/or force-fitting manner. The guiding walls can in particular be incorporated by welding. It is thus possible for example for a particularly stable tank to be manufactured which particularly withstands a large internal pressure.

BRIEF DESCRIPTION OF THE DRAWINGS

Preferred exemplary embodiments of the disclosure are explained in more detail below with reference to schematic drawings, in which.

DETAILED DESCRIPTION

Figure 1:
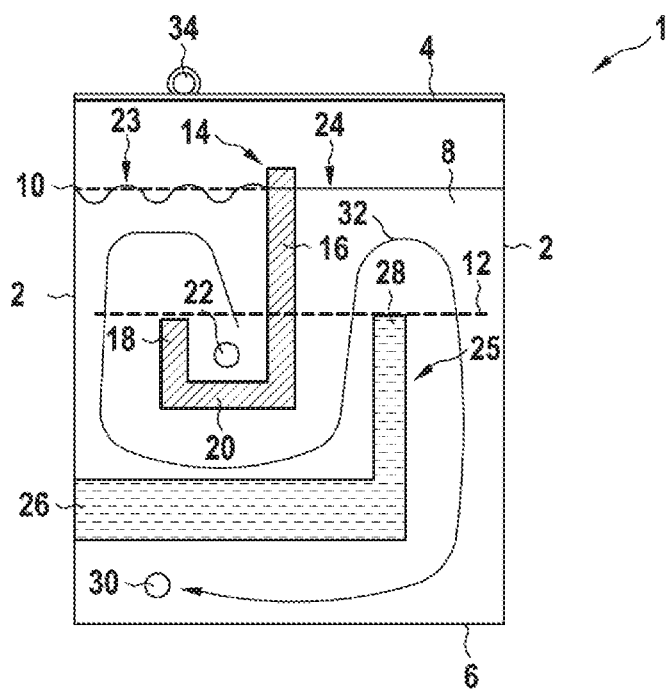
FIG. 1 shows the schematic construction of a tank according to one exemplary embodiment.

A tank 1 is illustrated in FIG. 1. As seen in cross section, it is of rectangular design and has two small tank walls 2, a tank cover 4, which is an upper tank wall, and a lower tank wall 6. Furthermore, the tank 1 has two large tank walls which are not illustrated here, however. They are each connected at the edges to the small tank walls 2, the tank cover 4 and the lower tank wall 6. Hydraulic fluid 8 is filled into the tank 1, with the hydraulic fluid filling level of the hydraulic fluid 8 reaching a maximum hydraulic fluid filling level 10. Furthermore, a minimum hydraulic fluid filling level 12 is indicated which the hydraulic fluid 8 should not fall below during an operation.

Guiding walls are additionally incorporated into the tank 1. A first guiding wall 14 extends from the one large tank wall, which is not illustrated, to the other large tank wall, which is likewise not illustrated. The guiding wall 14 is U-shaped. A leg 16 of the guiding wall 14 is formed in such a way that it projects beyond the maximum hydraulic fluid filling level 10. The leg 16 is additionally arranged centrally between the small tank walls 2. Furthermore, a second leg 18 of the U-shaped guiding wall 14 is formed in such a way that it ends below the minimum hydraulic fluid filling level 12. The two legs 16, 18 are connected to an intermediate piece 20 and extend approximately at a parallel spacing from one another. An opening of the U-shaped guiding wall 14 is directed upwardly. An inflow connection 22 is arranged so as to be enclosed by the U-shaped guiding wall 14, that is to say by the two legs 16, 18 and the connecting piece 20. Said inflow connection is arranged below the minimum hydraulic fluid filling level 12. The leg 16 additionally divides a surface of the hydraulic fluid 8 into two regions, with one region above the inflow connection 22 being a turbulent inflow region 23 which arises as a result of hydraulic fluid 8 flowing in through the inflow connection 22. The other region is a calm zone 24 in which the hydraulic fluid surface is not turbulent and/or agitated.

Furthermore, a second guiding wall 25 is integrated into the tank 1. Said wall is L-shaped and arranged below the first guiding wall 14. A leg 26 of the guiding wall 25 adjoins a small tank wall 2. The further leg 28 of the second guiding wall 25 extends upwardly. Here, the guiding wall 25 encompasses in a U shape the first guiding wall 14 together with the small tank wall 2 which is adjoined by the guiding wall 25. In addition, the outflow connection 30 is arranged below a leg 26 of the guiding wall 25. The hydraulic fluid 8 flows out of the tank 1 through this connection.

Between the inflow connection 22 and the outflow connection 30 there is formed a flow guide 32. It begins at the inflow connection 22 and, in order to leave the U-shaped guiding wall 14, the hydraulic fluid 8 rises upwardly along the flow guide 32. As a result, it is possible for example for air bubbles to be separated and rise easily from the hydraulic fluid 8. The flow guide 32 then follows a 180° flow arc with which the main flow direction changes by 180°. The flow guide 32 then extends downwardly along between the leg 18 of the guiding wall 14 and the small tank wall 2. The downward flow of the hydraulic oil 8 allows the air to be better separated from the hydraulic fluid 8. The flow guide 32 then impinges on the leg 26 of the second guiding wall 25. The flow guide is thus deflected again, with this time the flow changing through a flow arc of approximately 90°. The hydraulic fluid 8 then flows along between the connecting piece 20 and the leg 26 until it impinges on the leg 28 of the second guiding wall 25. Here, there occurs a further main flow direction change through 90°. Thus, the overall direction change of the flow guide 32 is about 360° or twice 180°, with the result that the flow guide 32 now flows upwardly again. The flow guide 32 now follows the leg 16 and the leg 28 and flows along between the two legs 16, 28. The flow then changes a further time through a flow arc of 180°. This flow arc follows around an end of the leg 28 of the guiding wall 25. The flow now extends downwardly, with the result that here the air can be separated again from the hydraulic fluid 8. The flow guide 32 extends between one of the small tank walls 2 and the leg 28. The flow guide 32 then extends in a further flow arc through 90°. The flow guide 32 then follows the L-shaped guiding wall 25 and the lower tank wall 6. The hydraulic fluid 8 then reaches the outflow connection 30.

An integrated fastening point 34 is arranged on the tank cover 4. Alternatively or additionally, another prepared geometry and/or a prepared thread can be arranged on the tank cover 4.

Figure 2:
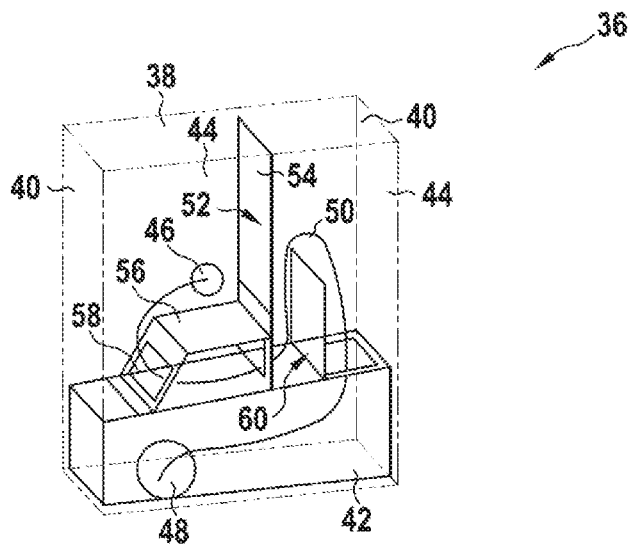
FIG. 2 is a perspective illustration showing a tank made of sheet metal according to a further exemplary embodiment.

FIG. 2 shows a tank 36 which is welded, for example. It is likewise of rectangular design and has a tank cover 38, small tank walls 40, a lower tank wall 42 and large tank walls 44 to which guiding walls in this example can, for example, be welded on and/or connected in a form-fitting and/or force-fitting and/or integrally bonded manner. As also in FIG. 1, the tank 36 has an inflow connection 46 and an outflow connection 48. A flow guide 50 is formed between them.

A first guiding wall 52 of this tank 36 is L-shaped, with one leg 54 projecting upwardly and another leg 56 in the direction of a small tank wall 40. In order to impart more stability to the tank, there is incorporated for example, in addition to the guiding walls, a reinforcement 58 which has an opening through which the flow guide 50 passes Like the tank wall 25 of FIG. 1, too, a second tank wall 60 is L-shaped and likewise arranged.

The flow guide 50 extends from the inflow connection 46 to the outflow connection 48. The flow guide 50 extends along the lower leg 56 of the first guiding wall 52 through the opening of the first reinforcement 58 and then extends between the leg 56 of the guiding wall 52 and the L-shaped guiding wall 60. The flow guide 50 then follows a flow arc and the flow guide 50 extends upwardly along the second leg 54 of the guiding wall 52 and between the guiding wall 60. There then occurs a further main flow direction change downwardly around the guiding wall 60 through a further opening of a further reinforcement 58. The flow guide 50 is then directed as far as the outflow connection 48.

Figure 3:
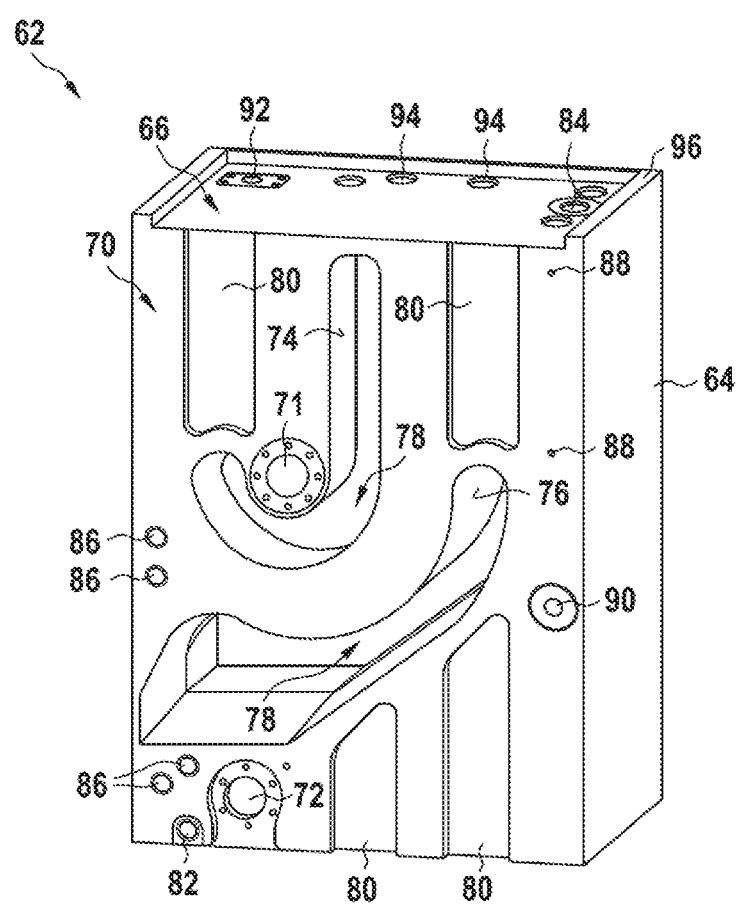
FIG. 3 is a perspective illustration showing a rotationally molded tank according to a further exemplary embodiment.

FIG. 3 illustrates a rotationally molded tank 62. It is parallelepipedal in design and has small tank walls 64, a tank cover 66, a lower tank wall, which cannot be seen here, and large tank walls 70, only one large tank wall 70 being visible in this illustration. Like the tank 1 and the tank 36 of FIG. 1 and FIG. 2, too, the tank 62 has an inflow connection 71 and an outflow connection 72. It is possible for example for hydraulic hoses to be fitted there.

Furthermore, the tank 62 has two guiding walls. One guiding wall 74, which encompasses the inflow connection 71 in a U shape, corresponds for example approximately to the guiding wall 14 of the tank 1. The guiding wall 76, one leg of which begins at a lateral tank wall 64 and the other leg of which projects upwardly, corresponds for example approximately to the guiding wall 25 from tank 1. The guiding walls 74, 76 are of double-walled design, the tank 62 having clearances 78 from outside between the double-walled guiding walls 74, 76. It is possible for example for add-on parts, which are not illustrated here, such as, for example, a pump and/or a hydraulic machine and/or a hydraulic fluid cooling circuit, to be installed in these clearances 78 in a space-saving manner. Furthermore, the rotationally molded tank 62, which is particularly made of thermoplastic, has indentations 80 which impart increased mechanical stability to the tank 62.

It is possible for further functional elements to be integrated into the tank 62 during the rotational molding. These include for example an outflow 82 by means of which hydraulic fluid can be drained from the tank 62. Furthermore, an inlet 84 has been integrated into the tank cover 66, through which inlet hydraulic fluid can be filled. Additionally integrated are connections 86 to which, for example, a hydraulic fluid cooling circuit can be connected. Fastening possibilities 88 are also already integrated. They allow the tank to be fastened for example to a working machine and/or to an underlying surface. In addition, at least one sensor connection 90 is provided through which, for example, a pressure sensor can be introduced. Apart from the inlet 84, the tank cover 66 can additionally have arranged therein further functional elements, such as, for example, a vent 92 or valves 94.

The tank cover 66 additionally has a three-sided border 96. This is arranged in such a way that hydraulic fluid which drops, for example, from consumers which are arranged above the tank 62 can thus be collected and in such a way that the hydraulic fluid can run off only in one direction. The hydraulic fluid can be channeled, for example, into a collection container by the three-sided border 96. It is also possible for the border 96 to be four-sided and for only a small outflow in the border 96 to be provided.

What is disclosed is a tank for a hydraulic unit, which tank can be filled with a hydraulic fluid. Furthermore, the tank has at least one inflow connection and at least one outflow connection, wherein a flow guide for the hydraulic fluid is formed between the inflow connection and the outflow connection. The flow guide is formed in such a way that it has at least two 180° flow arcs for cooling and for calming the hydraulic fluid and for avoiding dead zones.

LIST OF REFERENCE SIGNS

1,36,62 Tank
2,40,64 Small tank wall
4,38,66 Tank cover
6,42, Lower tank wall
8 Hydraulic fluid
10 Maximum hydraulic fluid filling level
12 Minimum hydraulic fluid filling level
14,25,52,60,74,76 Guiding wall
16,18,26,28,54,56 Leg
20 Connecting piece
22,46,71 Inflow connection
23 Turbulent inflow region
24 Calm zone
30,48,72 Outflow connection
32,50 Flow guide
34 Thread
44,70 Large tank wall
58 Reinforcement
78 Clearance
80 Indentation
82 Outflow
84 Inlet
86 Connection
88 Fastening possibilities
90 Sensor connection
94 Valves
96 Border

What is claimed is:

1. A tank for a hydraulic unit, comprising:
   at least one inflow connection configured to receive hydraulic fluid into the tank;
   at least one outflow connection spaced apart from the at least one inflow connection and configured to release the hydraulic fluid out of the tank; and
   a flow path defined between the at least one inflow connection and the at least one outflow connection, the flow path having at least two sequential 180° flow arcs configured to calm and cool the hydraulic fluid and to avoid dead zones, the at least two sequential 180° flow arcs configured to provide two downwardly flowing segments flowing in the direction of gravitational force separated by a horizontally flowing segment passing beneath the at least one inlet, and separated by an upwardly flowing segment.

2. The tank according to claim 1, further comprising at least one guiding wall configured to define the flow path.

3. The tank according to claim 2, further comprising at least four lateral tank walls that extend upwardly approximately from a bottom of the tank, wherein at least two of the four tank walls are large tank walls that include a first large tank wall and a second large tank wall situated opposite the first large tank wall, and wherein the at least two other tank walls are small tank walls.

4. The tank according to claim 3, wherein the guiding wall extends from the first large tank wall to the second large tank wall, which faces the first large tank wall.

5. The tank according to claim 2, wherein the guiding wall is double-walled.

6. The tank according to claim 2, wherein the guiding wall extends from above a maximum hydraulic fluid filling level to below the maximum fluid filling level.

7. The tank according to claim 2, wherein the guiding wall partially encompasses the inflow connection in a U shape or L shape, wherein an opening of the U-shaped or L-shaped guiding wall is directed upwardly, wherein a first upwardly extending leg of the U-shaped or L-shaped guiding wall is arranged below a minimum hydraulic fluid filling level, and wherein a second upwardly extending leg extends above the maximum hydraulic fluid filling level.

8. The tank according to claim 3, wherein a further guiding wall starts from one of the small tank walls and extends from the first large tank wall to the second large tank wall, and wherein a leg of the further guiding wall projects upwardly.

9. The tank according to claim 8, wherein at least one of the guiding wall and the further guiding wall is arranged such that the flow path:
   follows a first approximately 180° flow arc starting from the inflow connection, with the result that the hydraulic fluid first flows upwardly, counter to the gravitational force, and then downwardly,
   then follows a second approximately 180° flow arc, with the result that the hydraulic fluid is directed upwardly,
   then follows a third approximately 180° flow arc, with the result that the hydraulic fluid is directed downwardly, and
   then follows an approximately 90° flow arc, with the result that the hydraulic fluid is directed toward the outflow connection.

10. The tank according to claim 1, further comprising an upper tank wall that has a three-sided raised border.

11. The tank according to claim 1, further comprising one or more of a cross member within the tank and an inwardly indentation in one of the four tank walls.

12. The tank according to claim 1, wherein the tank is formed one or more of by rotational molding, from metal, from sheet metal, and from plastic.

13. The tank according to claim 1, wherein one or more of the inflow connection and the outflow connection is one or more of integrated and injection-molded into the tank.

14. The tank according to claim 1, wherein the flow path has at least three 180° flow arcs.

15. The tank according to claim 8, wherein the further guiding wall is arranged between the guiding wall and the bottom.

* * * * *